(12) United States Patent
Suzuki

(10) Patent No.: US 11,443,748 B2
(45) Date of Patent: Sep. 13, 2022

(54) METRIC LEARNING OF SPEAKER DIARIZATION

(71) Applicant: INTERNATIONAL BUSINESS MACHINES CORPORATION, Armonk, NY (US)

(72) Inventor: Masayuki Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 16/807,818

(22) Filed: Mar. 3, 2020

(65) Prior Publication Data

US 2021/0280196 A1 Sep. 9, 2021

(51) Int. Cl.
*G10L 17/04* (2013.01)
*G06N 20/00* (2019.01)
*G10L 17/00* (2013.01)

(52) U.S. Cl.
CPC ............ *G10L 17/04* (2013.01); *G06N 20/00* (2019.01); *G10L 17/00* (2013.01)

(58) Field of Classification Search
CPC ......... G10L 17/04; G10L 17/00; G06N 20/00; G06N 3/0454; G06N 3/084
See application file for complete search history.

(56) References Cited

U.S. PATENT DOCUMENTS

| 6,411,930 | B1 * | 6/2002 | Burges | G10L 17/06 |
| | | | | 704/E17.007 |
| 8,554,563 | B2 * | 10/2013 | Aronowitz | G10L 17/12 |
| | | | | 704/250 |
| 9,542,948 | B2 * | 1/2017 | Roblek | G10L 17/18 |
| 9,640,197 | B1 * | 5/2017 | Fukuda | G10L 21/028 |
| 9,715,660 | B2 * | 7/2017 | Parada San Martin | ................ |
| | | | | G06N 3/0454 |
| 10,008,209 | B1 * | 6/2018 | Qian | G10L 17/18 |
| 10,140,980 | B2 * | 11/2018 | Bengio | G10L 19/0212 |
| 10,403,291 | B2 * | 9/2019 | Moreno | G10L 17/14 |
| 10,529,320 | B2 * | 1/2020 | Shafran | G10L 19/0212 |
| 10,693,872 | B1 * | 6/2020 | Larson | G06F 21/32 |
| 10,878,840 | B1 * | 12/2020 | Mitchell | G10L 25/27 |
| 11,223,699 | B1 * | 1/2022 | Niewczas | G10L 17/06 |
| 2004/0230420 | A1 * | 11/2004 | Kadambe | G10L 15/07 |
| | | | | 704/E15.011 |

(Continued)

OTHER PUBLICATIONS

Yu et al., "Ensemble Additive Margin Softmax for Speaker Verification", DOI: 10.1109/ICASSP.2019.8683649, IEEE, ICASSP, 2019. (Year: 2019).*

(Continued)

*Primary Examiner* — Anne L Thomas-Homescu
(74) *Attorney, Agent, or Firm* — Tutunjian & Bitetto, P.C.; Randall Bluestone

(57) ABSTRACT

A computer-implemented method includes obtaining, using a hardware processor, training data including utterances of speakers and performing tasks to train a machine learning model that converts an utterance into a feature vector, each task using one subset of multiple subsets of training data. The subsets of training data include a first subset of training data including utterances of a first number of speakers and at least one second subset of training data. Each second subset of training data includes utterances of a number of speakers that is less than the first number of speakers.

19 Claims, 7 Drawing Sheets

(56) References Cited

U.S. PATENT DOCUMENTS

| | | | | |
|---|---|---|---|---|
| 2009/0319269 | A1* | 12/2009 | Aronowitz | G10L 17/00 704/243 |
| 2010/0161327 | A1* | 6/2010 | Chandra | G10L 15/1807 704/235 |
| 2013/0006635 | A1* | 1/2013 | Aronowitz | G06N 7/005 704/245 |
| 2016/0283185 | A1* | 9/2016 | McLaren | G10L 25/54 |
| 2017/0287490 | A1* | 10/2017 | Biswal | G10L 17/22 |
| 2018/0254051 | A1* | 9/2018 | Church | H04M 3/51 |
| 2018/0293988 | A1* | 10/2018 | Huang | G10L 17/20 |
| 2018/0349158 | A1* | 12/2018 | Swersky | G06N 3/0472 |
| 2019/0043508 | A1* | 2/2019 | Sak | G10L 17/00 |
| 2019/0066713 | A1* | 2/2019 | Mesgarani | G10L 17/26 |
| 2019/0096424 | A1* | 3/2019 | Khoury | G10L 25/78 |
| 2019/0115029 | A1* | 4/2019 | Kracun | G10L 15/08 |
| 2019/0172443 | A1* | 6/2019 | Shechtman | G10L 13/047 |
| 2019/0341055 | A1* | 11/2019 | Krupka | G10L 25/84 |
| 2020/0043467 | A1* | 2/2020 | Qian | G06N 3/0445 |
| 2020/0043480 | A1* | 2/2020 | Shen | G10L 15/22 |
| 2020/0090034 | A1* | 3/2020 | Ramachandran | G10L 15/16 |
| 2020/0135209 | A1* | 4/2020 | Delfarah | G10L 15/20 |
| 2020/0160846 | A1* | 5/2020 | Itakura | G10L 17/02 |
| 2020/0175961 | A1* | 6/2020 | Thomson | G10L 15/22 |
| 2020/0184997 | A1* | 6/2020 | Lawson | H04L 27/0012 |
| 2020/0211544 | A1* | 7/2020 | Mikhailov | G10L 25/90 |
| 2020/0401948 | A1* | 12/2020 | Ma | G06F 11/3495 |
| 2021/0035563 | A1* | 2/2021 | Cartwright | G06N 7/005 |
| 2021/0043216 | A1* | 2/2021 | Wang | G10L 17/18 |
| 2021/0065680 | A1* | 3/2021 | Audhkhasi | G10L 15/16 |
| 2021/0104234 | A1* | 4/2021 | Zhang | G10L 15/197 |
| 2021/0183383 | A1* | 6/2021 | Volovich | H04R 1/1091 |
| 2021/0201890 | A1* | 7/2021 | Wang | G10L 21/01 |
| 2021/0233511 | A1* | 7/2021 | Li | G10L 15/02 |
| 2021/0241776 | A1* | 8/2021 | Sivaraman | G10L 21/038 |
| 2022/0004702 | A1* | 1/2022 | Liang | G06F 16/3329 |
| 2022/0076665 | A1* | 3/2022 | Baughman | G10L 21/0272 |

OTHER PUBLICATIONS

Deng et al., "ArcFace: Additive Angular Margin Loss for Deep Face Recognition", Proceedings of the 2019 IEEE Conference on Computer Vision and Pattern Recognition. Jun. 16-20, 2019. (pp. 4690-4699.).

Liu et al., "Large-Margin Softmax Loss for Convolutional Neural Networks", Proceedings of the 33rd International Conference on Machine Learning. arXiv:1612.02295v4 [stat.ML], Nov. 17, 2017. (pp. 1-10.).

Liu et al., "SphereFace: Deep Hypersphere Embedding for Face Recognition", Proceedings of the 2017 IEEE Conference on Computer Vision and Pattern Recognition. arXiv:1704.08063v4 [cs.CV]. Jan. 29, 2018. (pp. 1-13.).

Liu et al., "Deep Hyperspherical Learning", 31st Conference on Neural Information Processing Systems (NIPS 2017). arXiv:1711.03189v5 [cs.LG] Jan. 30, 2018. (pp. 1-14.).

Liu et al., "Large Margin Softmax Loss for Speaker Verification" arXiv:1904.03479v1 [cs.SD] Apr. 6, 2019. (pp. 1-5.).

Narayanaswamy et al., "Designing and Effective Metric Learning Pipeline for Speaker Diarization", 2019 IEEE International Conference on Acoustics, Speech and Signal Processing. May 12, 2019. (pp. 5806-5810.).

Song et al., "Triplet Network with Attention for Speaker Diarization", arXiv:1808.01535v1 [eess.AS] Aug. 4, 2018. (pp. 1-5.).

Sztaho et al., "Deep learning methods in speaker recognition: a review", arXiv:1911.066165. Nov. 14, 2019. (pp. 1-12.).

Wang et al., "CosFace: Large Margin Cosine Loss for Deep Face Recognition", arXiv:1801.09414v2 [cs.CV] Apr. 3, 2018. (pp. 1-11.).

Wang et al., "Additive Margin Softmax for Face Verification", arXiv:1801.05599v4 [cs.CV] May 30, 2018. (pp. 1-7.).

List of IBM Patents or Patent Applications Treated as Related dated Mar. 3, 2020, 2 pages.

* cited by examiner

METRIC LEARNING OF SPEAKER DIARIZATION

BACKGROUND

Technical Field

The present invention relates to metric learning of speaker diarization, and more specifically, to metric learning of speaker diarization for converting an utterance into a multidimensional vector.

Description of the Related Art

Speaker diarization is a technology that estimates who is speaking in a certain part of an audio recording. In speaker diarization, an utterance of a speaker is converted into a feature vector in a multidimensional space by using metric learning. Thereafter, the feature vector is clusterized to distinguish the speaker. As can be appreciated, utterances of the same speaker convert to the same feature vectors, and utterances of different speakers convert to different feature vectors.

SUMMARY

According to an embodiment of the present invention, a computer-implemented method includes obtaining, using a hardware processor, training data including a plurality of utterances of a plurality of speakers and performing a plurality of tasks to train a machine learning model that converts an utterance of the plurality of utterances into a feature vector. Each task uses one of a plurality of subsets of training data where the plurality of subsets of training data includes a first subset of training data including utterances of a first number of speakers among the plurality of speakers, and at least one second subset of training data where each second subset includes utterances of a number of speakers among the plurality of speakers that is less than the first number of speakers among the plurality of speakers.

According to another embodiment of the present invention, a computer program product including one or more computer-readable storage mediums collectively storing program instructions that are executable by a processor or programmable circuitry to cause the processor or programmable circuitry to perform operations including obtaining training data including a plurality of utterances of a plurality of speakers and performing a plurality of tasks to train a machine learning model that converts an utterance of the plurality of utterances into a feature vector. Each task uses one of a plurality of subsets of training data where the plurality of subsets of training data includes a first subset of training data including utterances of a first number of speakers among the plurality of speakers, and at least one second subset of training data where each second subset including utterances of a number of speakers among the plurality of speakers that is less than the first number of speakers among the plurality of speakers.

According to another embodiment of the present invention, an apparatus includes a processor or a programmable circuitry and one or more computer-readable mediums collectively including instructions that, when executed by the processor or the programmable circuitry, cause the processor or the programmable circuitry to obtain training data including a plurality of utterances of a plurality of speakers and perform a plurality of tasks to train a machine learning model that converts an utterance of the plurality of utterances into a feature vector. Each task uses one of a plurality of subsets of training data, where the plurality of subsets of training data includes a first subset of training data including utterances of a first number of speakers among the plurality of speakers, and at least one second subset of training data where each second subset includes utterances of a number of speakers among the plurality of speakers that is less than the first number of speakers among the plurality of speakers.

DETAILED DESCRIPTION

Hereinafter, example embodiments of the present invention will be described. The example embodiments shall not limit the invention according to the claims, and the combinations of features described in the embodiments are not necessarily essential to the invention.

Figure 1:
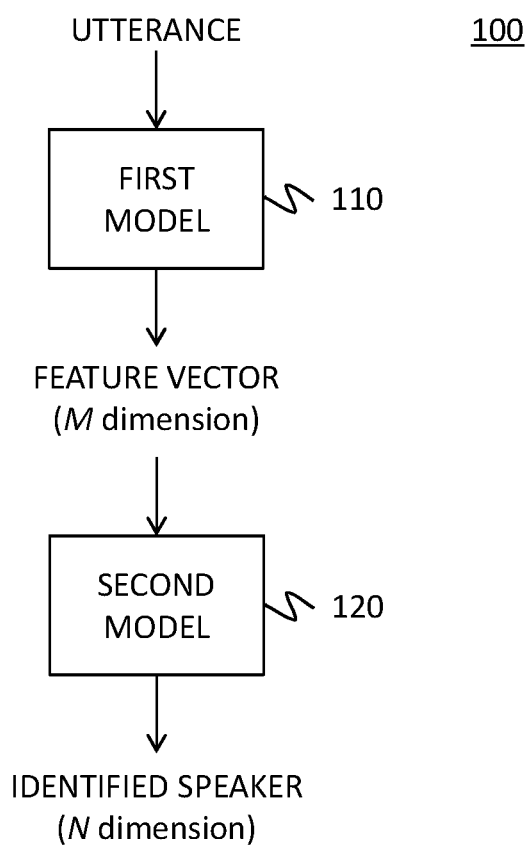
FIG. 1 shows a machine learning model according to an embodiment of the present invention.

FIG. 1 shows a machine learning model 100 according to an embodiment of the present invention. The machine learning model 100 may be implemented on and performed by one or more computers, programmable circuitry, dedicated circuitry, or the like. As can be appreciated, the machine learning model 100 is a model that is to be trained to identify a speaker from an utterance of the speaker. In one non-limiting embodiment, the machine learning model 100 includes a first model 110 and a second model 120.

In embodiments, the first model 110 is a model that converts an utterance of a speaker into a feature vector that represents features or characteristics concerning speech of the speaker. The utterance is a recording of audio spoken by or voice data of a certain speaker to be identified and may be a time-series data sequence or stream including a predetermined number of instantaneous values of audio or voice data. The feature vector is a vector in an M-dimensional space. In embodiments, M is a positive integer value. The first model 110 has parameters that are trained or optimized by training. In an embodiment, the first model 110 may be a neural network such as a convolutional neural network (CNN) as an example. This neural network may receive the instantaneous values in input nodes in an input layer and output a feature vector having M vector elements from an output layer.

In embodiments, the second model 120 is a model that identifies the speaker from the feature vector and outputs an identification of the speaker. In one non-limiting embodiment, the identification of the speaker is represented as an identification vector in an N-dimensional space. It is contemplated that N is an integer value that is more than 1. Each element of the identification vector corresponds to each speaker among N speakers. An element of the identification vector becomes a first value (e.g. "1") if the machine learning model 100 determines that a speaker corresponding to the element has spoken the utterance, and otherwise becomes a second value (e.g. "0.") In another embodiment, each element of the identification vector represents a probability that the corresponding speaker has spoken the utterance. The second model 120 also has parameters that are trained or optimized by training. In an embodiment, the second model 120 may include a neural network such as a full connection neural network. This neural network may receive the values of elements of the feature vector and output values of elements of the identification vector.

Figure 2:
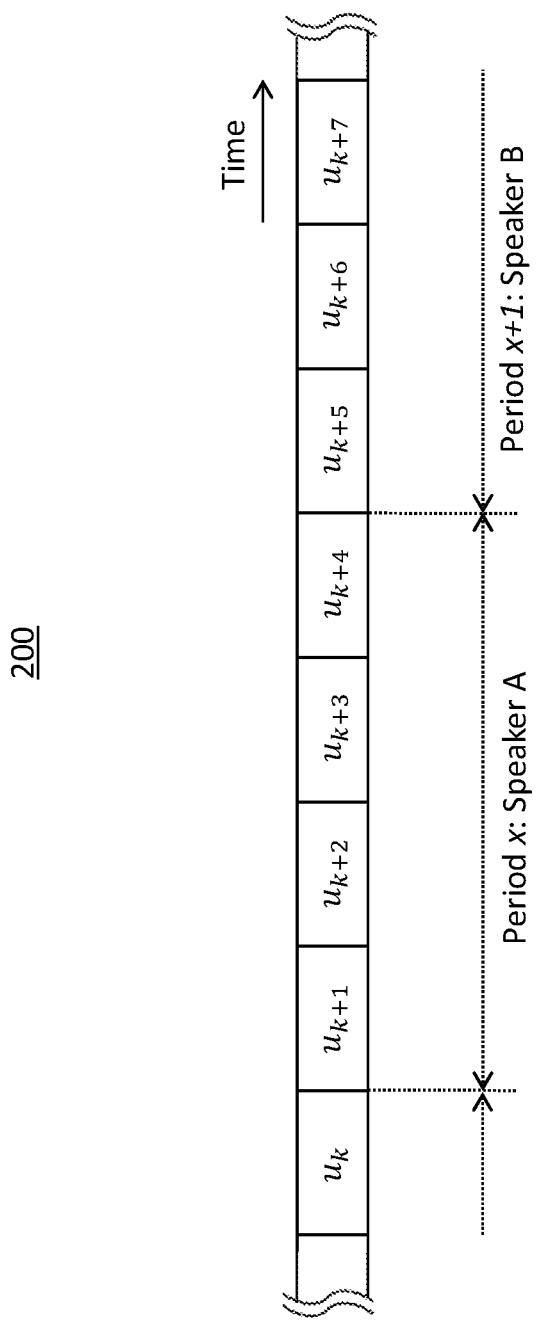
FIG. 2 shows audio data according to an embodiment of the present invention.

FIG. 2 shows audio data 200 according to an embodiment of the present invention. It is envisioned that audio data may be obtained from one or more microphones or recorded by an audio recorder, video recorder, or the like. Such audio data may be a recording of a speech of one speaker, a conversation of a group of speakers, and so on. A single speech or a single conversation is recorded in a single continuous recording. A single continuous recording may be stored as a single audio file.

As can be appreciated, in audio data of a single continuous recording, each speaker speaks one or more sentences, and these sentences may include a time-series sequence of utterances. As illustrated in FIG. 2, utterances $u_{k+1}$ to $u_{k+4}$ are spoken by speaker A in period x and utterances $u_{k+5}$ to $u_{k+7}$ are spoken by speaker B in the next period x+1. In this embodiment, the speech of a speaker is divided into pronunciations of words by, for example, using speech recognition, and each pronunciation of a word is treated as an utterance. In another embodiment, the audio data is divided into a plurality of pieces, each having a predetermined interval, and each piece of audio data is treated as an utterance.

In embodiments, the training data for training the machine learning model, such as the machine learning model 100, includes a plurality of utterances, and each utterance in the training data is paired or annotated with an identification of a speaker corresponding to the utterance. It is contemplated that an identifier of a speaker may be assigned to each utterance, or a speaker of continuous utterances is marked by using metadata such as a set of a start time, an end time, and an identifier of a speaker between the start and the end time.

Figure 3:
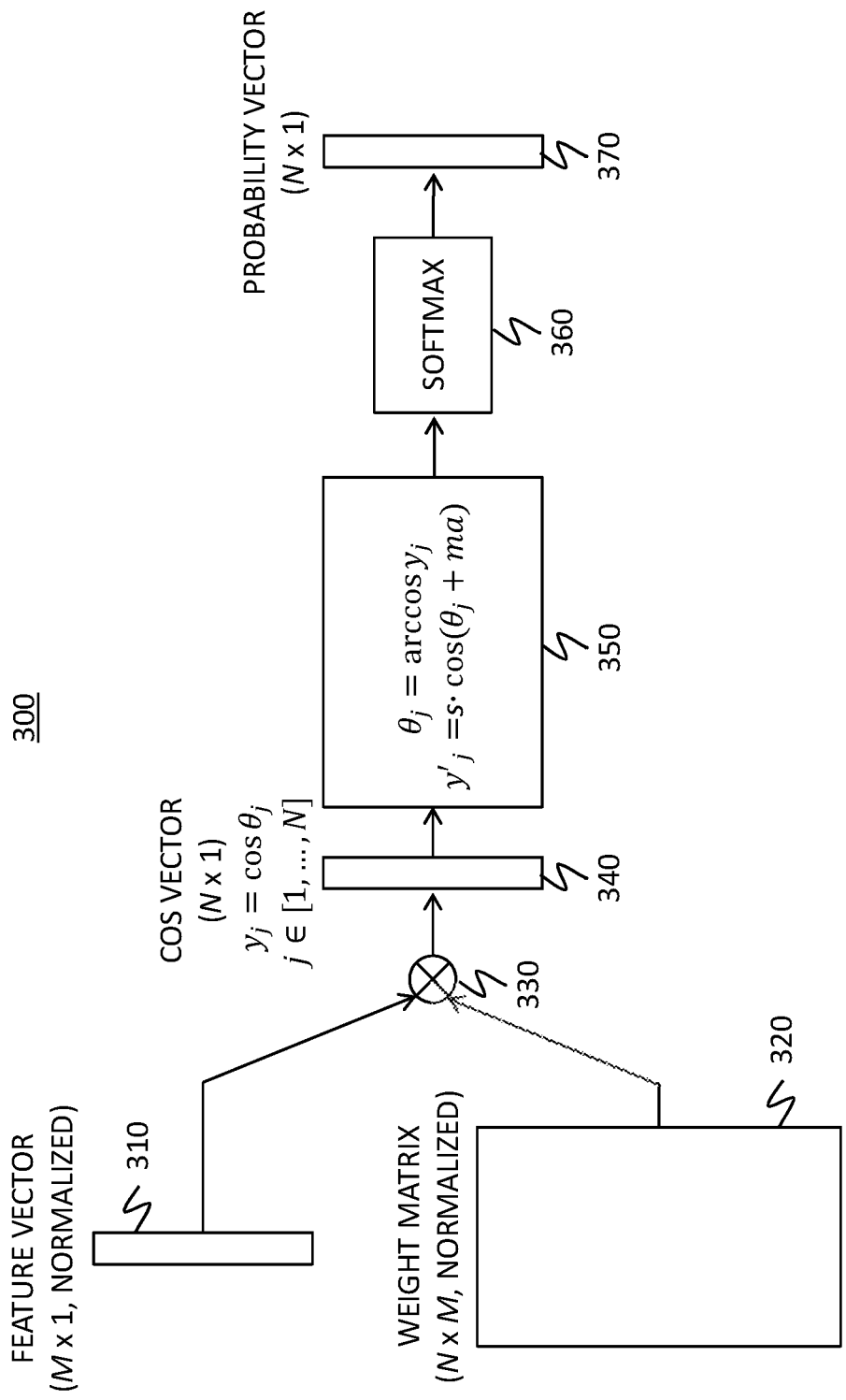
FIG. 3 shows a second model according to an embodiment of the present invention.

FIG. 3 shows a second model 300 according to an embodiment of the present invention. The second model 300 may be a detailed version of the second model 120 in FIG. 1 or different from the second model 120. While the second model 300 will be explained in reference to the machine learning model 100 in FIG. 1, the second model 300 can be implemented in other machine learning models as well.

In one non-limiting embodiment, an Additive Angular Margin Loss (ArcFace) method is adapted as a loss function for the second model. In other embodiments, the second model 300 may use any other loss functions. The second model 300 includes the weight matrix 320, the multiplier 330, the conversion unit 350, and the calculating unit 360.

In embodiments, the weight matrix 320 is an N by M matrix W where N is a number of speakers to be identified and M is the dimension of the feature vector 310 from the first model. $W_j$ (j=1, ..., N) denotes the j-th row of the weight matrix 320 and is also referred to as a row vector of the weight matrix 320. In this embodiment, each row vector $W_j$ is normalized (i.e. the length of each row vector $W_j$ is 1.0).

It is envisioned that the multiplier 330 receives the weight matrix 320, multiplies the weight matrix 320 by the feature vector 310 from the first model, such as the first model 110, and outputs a cosine vector 340. The feature vector 310 is also normalized by the first model 110 or normalized in the second model 300. In this manner, each element $y_j$ of the cosine vector 340 is calculated as a cosine of the angle $\theta_j$ (i.e. $\cos \theta_j$) between the row vector $W_j$ of the weight matrix 320 and the feature vector 310.

In embodiments, the conversion unit 350 converts each element $y_j$ of the cosine vector 340 to $y'_j$ by applying hyperparameters of the second model 300. In this embodiment, the conversion unit 350 applies a scale s and a margin ma to each element $y_j$. The conversion unit 350 calculates $\theta_j$ by calculating the arccosine of $y_j$ (i.e. $\theta_j = \arccos y_j$). Then, the conversion unit 350 adds the margin ma to $\theta_j$, calculates a cosine of the added value $\theta_j + ma$, and multiplies the result by the scale s to obtain the converted element $y'_j$ (i.e. $h'_j = s \cdot \cos(\theta_j + ma)$).

It is contemplated that the calculating unit 360 calculates a probability vector 370 by applying the softmax function to each element $y'_j$ from the conversion unit 350. As can be appreciated, the probability vector 370 represents, for each speaker j, the probability that the speaker j spoke the utterance input to the first model 110. In an implementation, the speaker corresponding to the highest value of the probability vector 370 is estimated as the speaker who spoke the utterance.

In one non-limiting embodiment, the second model 300 can identify a speaker from the feature vector 310. It is envisioned that the second model 300 may be flexible by including hyperparameters, such as scale s and margin ma, that can be adjusted from outside of the model.

Figure 4:
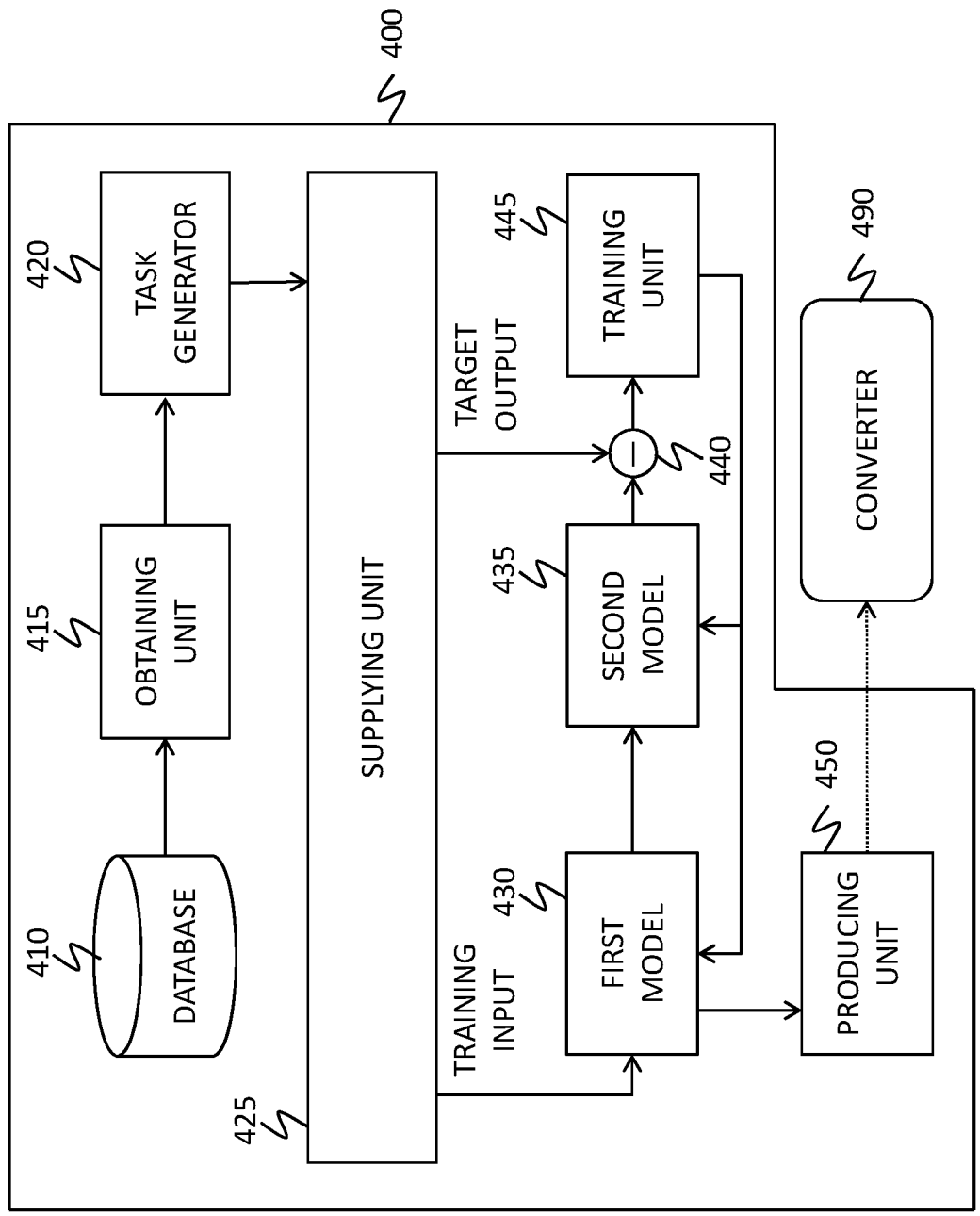
FIG. 4 shows an apparatus according to an embodiment of the present invention.

FIG. 4 shows an apparatus 400 according to an embodiment of the present invention. The apparatus 400 trains the machine learning model, such as the machine learning model 100, and generates the converter 490 that implements the first model, such as the first model 110. The apparatus 400 includes a database 410, an obtaining unit 415, a task generator 420, a supplying unit 425, a first model 430, a second model 435, a comparator 440, a training unit 445, and a producing unit 450.

In embodiments, the database 410 stores training data that includes a plurality of utterances of a plurality of speakers. The database 410 may store one or more audio files, each of which is obtained from a single continuous recording. It is contemplated that each utterance in the training data is annotated with an identification of a speaker corresponding to the utterance. Such annotations may be added to the training data by hand, or automatically added by recording in a special recording environment. In such a recording environment, a microphone may be placed near each speaker to distinguish the speaker based on the voice level. In another embodiment, the database 410 may be located outside of the apparatus 400. It is envisioned that the database 410 may be a storage device, a storage server, cloud storage or the like that is connected to the apparatus 400.

In embodiments, the obtaining unit 415 is connected to the database 410 and obtains training data that includes a plurality of utterances of a plurality of speakers from the database 410. The task generator 420 generates a plurality of tasks to train the machine learning model 100. It is contemplated that each task uses one of a plurality of subsets of training data and each subset of training data may include utterances of a different number of speakers among the plurality of speakers.

In one non-limiting embodiment, the supplying unit 425 is connected to the task generator 420. As can be appreciated, the supplying unit 425 performs, with the comparator 440 and the training unit 445, the plurality of tasks from the task generator 420 to train the machine learning model. For each task generated by the task generator 420, the supplying unit 425 supplies each utterance included in the corresponding subset of training data as training input data of the first model 430. The supplying unit 425 also supplies, for each utterance, a corresponding identification of the speaker as target output data to the comparator 440. The supplying unit 425 may convert the identification of the speaker, such as a speaker ID, into the form of an identification vector, and supply the identification vector to the comparator 440.

In embodiments, the first model 430 is connected to the supplying unit 425. The first model 430 is executed on the apparatus 400 and converts the training input data (i.e., an utterance) into a feature vector. The first model 430 may be the first model 110 in FIG. 1 or a different first model. The second model 435 is connected to the first model 430. The second model 435 is executed on the apparatus 400 and identifies the speaker from the feature vector output from the first model 430. In this embodiment, the first model 430 may output a probability vector such as the probability vector 370 to the comparator 440. In another embodiment, at least one of the first model 430 and the second model 435 may be located outside of the apparatus 400.

It is envisioned that the comparator 440 is connected to the supplying unit 425 and the second model 435. In this manner, the comparator 440 receives, from the second model 435, the identification of a speaker (i.e., the probability vector 370) estimated by the first model 430 and the second model 435. In embodiments, the comparator 440 also receives the target output data (i.e., the identification vector that identifies the actual speaker of the utterance) from the supplying unit 425. The comparing unit 440 compares the output data from the second model 435 and the target output data from the supplying unit 425 and may calculate an error or a difference between the output data from the second model 435 and the target output data from the supplying unit 425.

In one non-limiting embodiment, the training unit 445 is connected to the comparator 440. As can be appreciated, the training unit 445 trains the first model 430 and the second model 435 to reduce the error between the output data of the second model 435 and the target output data of the supplying unit 425. The training unit 445 may set or update tunable parameters such as weights and bias of the neural network in the first model 430 and the second model 435. It is contemplated that if the second model 300 in FIG. 3 is used as the second model 435, the training unit 445 may set or update the weight matrix 320.

In embodiments, the producing unit 450 is connected to the first model 430. The producing unit 450 produces, by using the trained first model, a converter 490 that converts an utterance of a speaker into a feature vector. The converter 490 may include a model that has the same structure as the first model 430. Initially, the converter 490 has initial untrained parameters in the model. The producing unit 450 may output trained parameters of the first model 430 and store these trained parameters in storage of the converter 490 so that the trained first model 430 is programmed in the converter 490.

Figure 5:
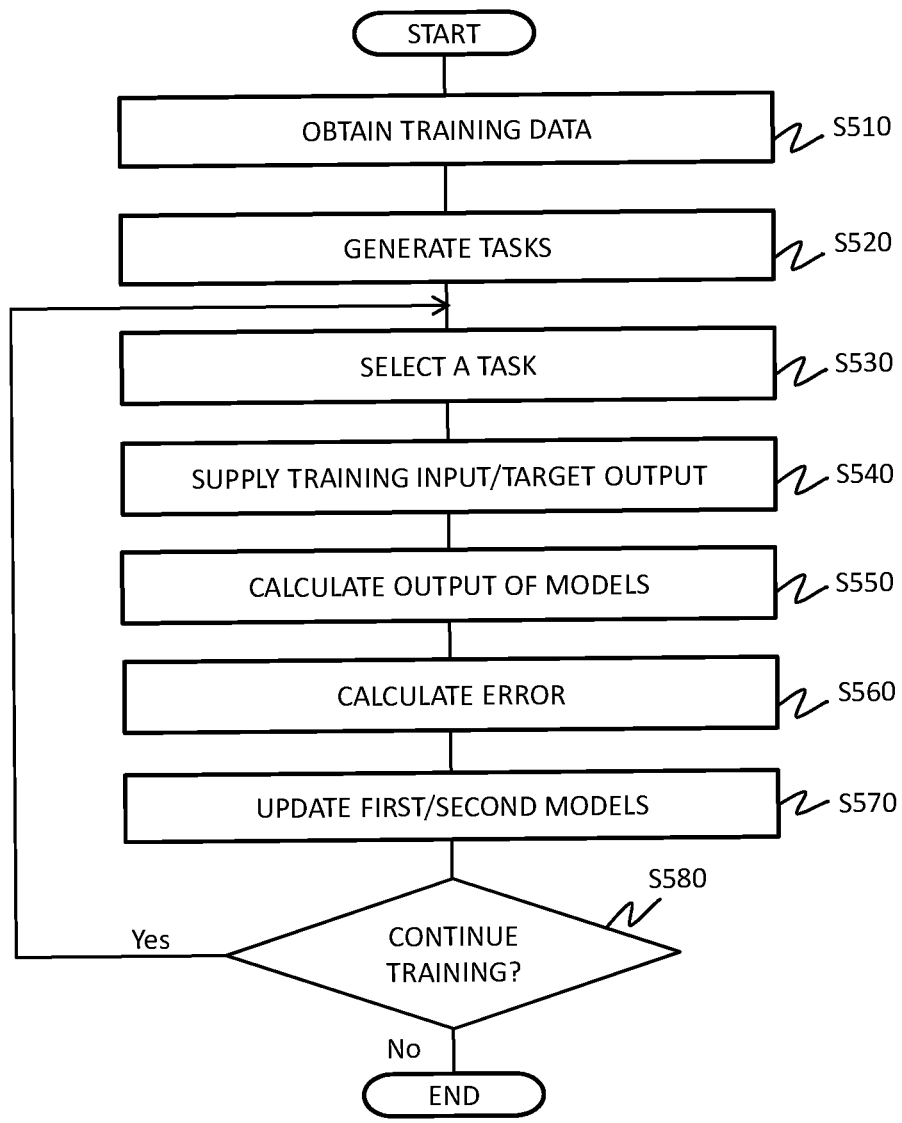
FIG. 5 shows an operational flow diagram according to an embodiment of the present invention.

FIG. 5 shows an operational flow diagram according to an embodiment of the present invention. It is contemplated that the operations of FIG. 5 can be performed by, for example, the apparatus 400 and its components that were described hereinabove with reference to FIG. 4. It is envisioned that the operations of FIG. 5 can also be performed by an apparatus including other components. As can be appreciated, while the operational flow of FIG. 5 will be explained in reference to the apparatus 400 and its components, the operational flow can be performed by other apparatuses having different components as well.

At S510 (Step 510), the obtaining unit 415 obtains training data including a plurality of utterances of a plurality of speakers from the database 410. It is contemplated that the training data may include a plurality of continuous recordings that may be stored in the database 410 as an audio file and may include utterances of the same or a different number of speakers.

At S520, the task generator 420 generates a plurality of tasks to train a machine learning model, such as the machine learning model 100 in FIG. 1. Each task uses one of a plurality of subsets of training data. In embodiments, the task generator 420 may generate a first task using a first subset of training data including utterances of a first number of speakers among the plurality of speakers. The task generator 420 may also generate tasks using at least one second subset of training data. Each second subset including utterances of a number of speakers among the plurality of speakers, that is less than the first number.

It is envisioned that the task generator 420 may generate the first task as the main task. In this manner, the first subset may include utterances of the largest number of speakers among the plurality of speakers. The task generator 420 may obtain utterances of the first subset of training data by combining two or more audio recordings. In an embodiment, the task generator 420 may obtain utterances from every audio recording, and thereby the first subset includes the entire training data.

In embodiments, the task generator 420 may generate at least one subtask using at least one second subset, respectively. Each second subset may include utterances of a number of speakers that is less than the number of speakers included in the first subset. The task generator 420 may obtain utterances of the second subset of training data from a single continuous recording or a smaller number of continuous recordings. It is contemplated that each second subset may include utterances of one, two, or less than ten speakers, while the first subset may include utterances of thousands of speakers.

From S530 to S580, the apparatus 400 performs the plurality of tasks according to a multi-task training technique. In this manner, the apparatus 400 performs the plurality of tasks concurrently to improve the accuracy of the machine learning model (i.e., the first model 430 and the second model 435) for every task in parallel.

At S530, the supplying unit 425 selects one task that is to be performed in the current iteration. The supplying unit 425 may select each task among the plurality of tasks in order, such as in a round-robin fashion, or at random. It is contemplated that the supplying unit 425 may equally select each task or may select tasks in different proportions. In one non-limiting embodiment, the supplying unit 425 may select the main task more often than the subtasks.

At S540, the supplying unit 425 selects an utterance and the corresponding identification of the speaker from the training data of the selected task. It is envisioned that the supplying unit 425 may randomly select the utterance from the training data or sequentially select the utterance for each time the corresponding task is selected. The supplying unit 425 may keep some utterances unselected so that the apparatus 400 can use them for cross-validation.

In embodiments, the supplying unit 425 supplies the selected utterance to the first model 430 as the training input of the machine learning model. It is contemplated that the supplying unit 425 may also supply the selected identification of the speaker to the comparator 440 as the target output of the machine learning model.

At S550, the first model 430 and the second model 435 calculate the output of the machine learning model. The first model 430 converts the selected utterance into a feature vector, and the second model 435 converts the feature vector into an identification of the speaker. In embodiments, the second model 435 may output an identification vector (e.g., the probability vector 370 illustrated in FIG. 3) as the identification of the speaker.

At S560, the comparator 440 calculates an error or a difference between the identification from the second model 435 and the target identification corresponding to the selected utterance.

At S570, the training unit 445 updates the parameters of the first model 430 and the second model 435 to reduce the error or the difference. It is contemplated that the training unit 445 may update the parameters of the first model 430 and the second model 435 by using a back-propagation technique from the output layer of the second model 435 through the input layer of the first model 430. In other embodiments, the training unit 445 may update the parameters of the first model 430 and the second model 435 by using other techniques, such as Gradient descent, as an example.

At S580, the apparatus 400 determines whether or not to continue the training. The apparatus 400 may perform cross-validation of the machine learning model and complete the training if the accuracy of the machine learning model is higher than a threshold. In the cross-validation, the supplying unit 425 supplies each utterance in a test set of training data to the first model 430 and supplies the corresponding identification of the speaker to the comparator 440. It is envisioned that the training unit 445 may obtain an error for each utterance in the test set and accumulate the error relating to each utterance from the test set. The training unit 445 may calculate an MSE (a mean square error) and may determine to continue the training if the MSE is higher than a threshold. In one non-limiting embodiment, the apparatus 400 may determine to complete the training if the number of executed iterations exceeds a maximum number. It is contemplated that if the apparatus 400 determines to continue the training, the apparatus 400 repeats the loop between S530 to S580.

In embodiments, after training the machine learning model, the producing unit 450 outputs the trained parameters of the first model 430 to produce a converter such as the converter 490. As can be appreciated, by training the first model 430 in combination with the second model 435, the apparatus 400 can optimize the first model 430 to output preferable feature vectors to distinguish or identify the speakers.

Figure 6:
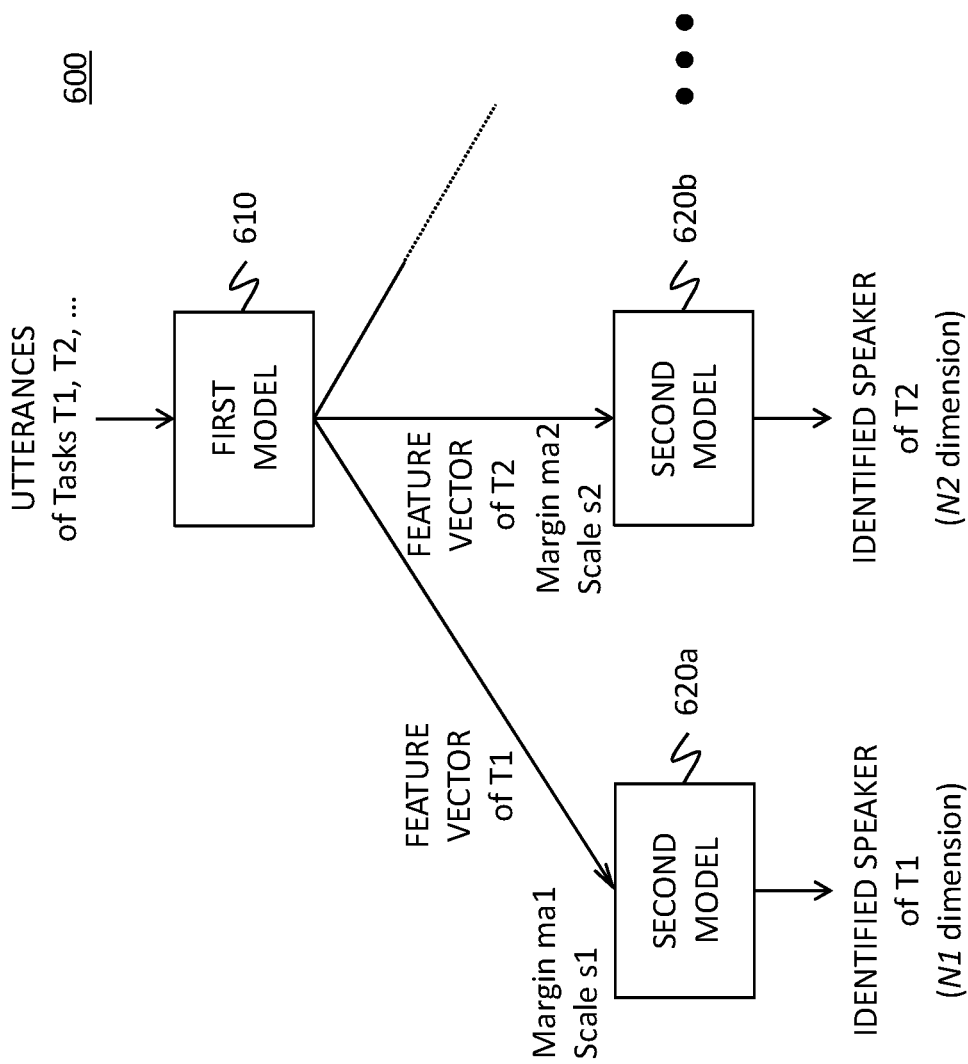
FIG. 6 shows another machine learning model according to an embodiment of the present invention.
Figure 7:
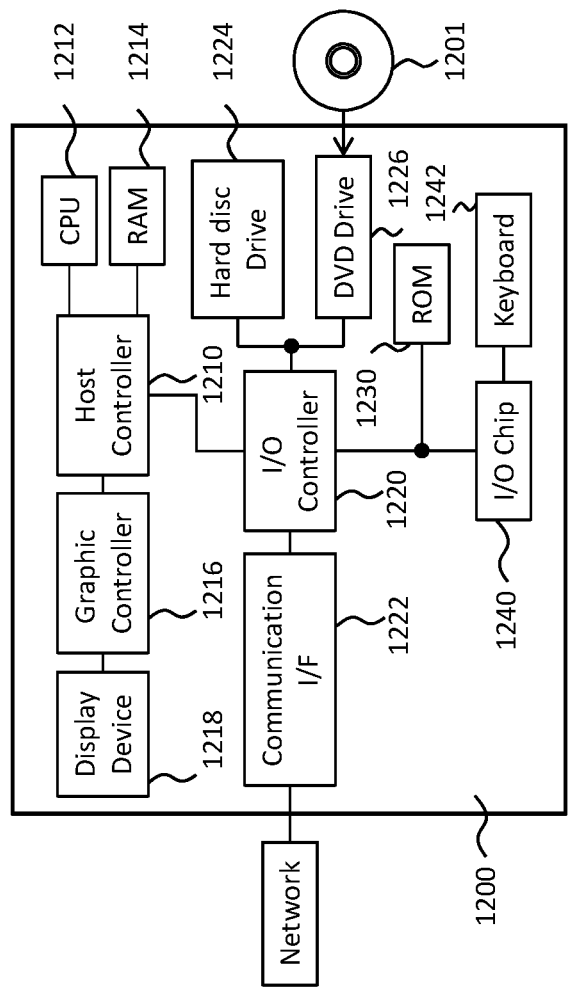
FIG. 7 shows a hardware configuration of a computer according to an embodiment of the present invention.

FIG. 6 shows a machine learning model 600 according to an embodiment of the present invention. The machine learning model 600 may be a detailed version of the first model 430 and the second model 435 in FIG. 4 or different from the first model 430 and the second model 435. It is contemplated that while the machine learning model 600 will be explained in reference to the apparatus 400 and its components, the machine learning model 600 can be implemented in other apparatuses as well.

In embodiments, the apparatus, such as the apparatus 400, may include the machine learning model 600 and performs one task using the first subset of training data and two or more tasks using the at least one second subset of training data. It is contemplated that the task using the first subset can be regarded as the main task that uses the first subset including utterances of the largest number of speakers. In embodiments, the other tasks can be regarded as subtasks, each of which uses a second subset that includes utterances of fewer speakers than the first subset.

In one non-limiting embodiment, the machine learning model 600 includes the first model 610 and a plurality of the second models 620 (i.e., the second model 620a, the second model 620b, . . . ). The first model 610 may be the first model 110 in FIG. 1, the first model 430 in FIG. 4, or a different first model. In embodiments, each of the second model 620 is connected to the first model 610. It is envisioned that the second model 620 may be the second model 120 in FIG. 2, the second model 435 in FIG. 4, or a different second model. In one non-limiting, the structures of the second models 620 are different if the number of speakers to be identified (N1, N2, . . . in FIG. 6) is different because the number of the output nodes is determined based on the number of speakers. It is contemplated that if the number of speakers is the same, the same structure may be used. It is envisioned that at least one hyperparameter of one or more second models 620 can also be different. In another embodiment, the plurality of second models 620 may have different structures (e.g. different number of intermediate nodes, different number of layers) or may use different machine learning models.

In one non-limiting embodiment, the second model 620a is used for the main task, and the second models 620b, 620c, . . . are used for the subtasks. The apparatus, such as the apparatus 400, may use a value of at least one hyperparameter of the second model 620a for the main task that is different from the value of the at least one hyperparameter of at least one of the subtasks. It is contemplated that the apparatus 400 may use a different margin ma between the main task and the subtasks. The value of margin ma1, which is a hyperparameter of the second model 620a for the main task, may be different from the value of margin ma2, which is a hyperparameter of the second model 620b for a subtask. The margins ma2, ma3, and so on for one or more subtasks can be larger than the margin ma1 for the main task. In an implementation, the task generator 420 may set a larger margin ma to a task using a subset including utterances of a smaller number of speakers. As can be appreciated, by setting larger margins for subtasks than the main task, the first model 610 can be improved to output more separate feature vectors for distinguishing a smaller number of speakers while it can still be used to convert an utterance to a feature vector that represents characteristics of the speaker.

In one embodiment, the utterances of each second subset of training data for each subtask are obtained from a single continuous recording and are likely to be recorded in a substantially similar acoustic environment. In this manner, even if larger margins are used for subtasks, there is relatively little risk of overfitting the machine learning model 600 to distinguish the speaker based on the difference of acoustic environment rather than the difference of sounds from different speakers.

In another embodiment, a training unit such as the training unit 445 in FIG. 4 changes or optimizes at least one hyperparameter for each task to improve the accuracy of the machine learning model including the first model 610 and one second model 620 corresponding to each task.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 8 shows an example of a computer 1200 in which aspects of the present invention may be wholly or partly embodied. In embodiments, a program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. It is contemplated that such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. In one non-limiting embodiment, the computer also includes legacy input/output units such as a ROM 1230 and a keyboard 1242, which are connected to the input/output controller 1220 through an input/output chip 1240.

In embodiments, the CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself and causes the image data to be displayed on the display device 1218.

In one non-limiting embodiment, the communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201 and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. It is contemplated that the input/output chip 1240 may also connect various input/output units via a parallel port, a serial port, a keyboard port, a mouse port, and the like to the input/output controller 1220.

In embodiments, a program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. It is contemplated that the information processing described in these programs is read into the computer 1200, resulting in cooperation between a program and the above-mentioned various types of hardware resources. As can be appreciated, an apparatus or method may be constituted by realizing the operation or processing of information in accordance with the usage of the computer 1200.

In embodiments, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

It is contemplated that the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

In embodiments, various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. It is envisioned that when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

It is contemplated that the above-explained program or software modules may be stored in the computer readable media on or near the computer 1200. In embodiments, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

Many of the embodiments of the present invention include artificial intelligence and include neural networks in particular. Some of the foregoing embodiments describe specific types of neural networks. However, a neural network usually starts as a configuration of random values. Such untrained neural networks must be trained before they can be reasonably expected to perform a function with success. Once trained, a neural network may not require further training. In this way, a trained neural network is a product of the process of training an untrained neural network.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-implemented method comprising:
   obtaining, using a hardware processor, training data stored on one or more computer readable storage mediums, the training data including a plurality of utterances of a plurality of speakers; and
   performing, using the hardware processor, a plurality of tasks to train a machine learning model that converts an utterance of the plurality of utterances into a feature vector, each task using one of a plurality of subsets of training data, wherein the plurality of subsets of training data includes:
   a first subset of training data including utterances of a first number of speakers among the plurality of speakers, and
   at least one second subset of training data, each second subset including utterances of a number of speakers among the plurality of speakers that is less than the first number of speakers among the plurality of speakers,
   wherein performing the plurality of tasks to train the machine learning model includes performing one task using the first subset of training data and two or more tasks using the at least one second subset of training data.

2. The computer-implemented method of claim 1, wherein performing the plurality of tasks to train the machine learning model includes performing the plurality of tasks according to a multi-task training technique.

3. The computer-implemented method of claim 1, wherein
   the machine learning model includes a first model for converting an utterance of the plurality of utterances into a feature vector and a second model for identifying a speaker of the plurality of speakers from a feature vector, and
   each utterance of the plurality of utterances in the training data is paired with an identification of a speaker of the plurality of speakers corresponding thereto.

4. The computer-implemented method of claim 3, further comprising producing, using the hardware processor, a converter that converts an utterance of a speaker of the plurality of speakers into a feature vector by training the first model.

5. The computer-implemented method of claim 3, wherein performing the plurality of tasks includes using a value of at least one hyperparameter of the task using the first subset of training data that is different from the value of the at least one hyperparameter of the task using the at least one second subset of training data.

6. The computer-implemented method of claim 5, wherein the at least one hyperparameter is a margin of loss function.

7. The computer-implemented method of claim 1, wherein the utterances of the second subset of training data are recorded in a substantially similar acoustic environment.

8. The computer-implemented method of claim 1, wherein the utterances of the second subset of training data are obtained from a single continuous recording.

9. The computer-implemented method of claim 1, wherein the utterances of the first subset of training data are obtained by combining two or more audio recordings.

10. A computer program product including one or more computer-readable storage mediums collectively storing program instructions that are executable by a processor or programmable circuitry to cause the processor or programmable circuitry to perform operations comprising:
    obtaining training data including a plurality of utterances of a plurality of speakers; and
    performing a plurality of tasks to train a machine learning model that converts an utterance of the plurality of utterances into a feature vector, each task using one of a plurality of subsets of training data, wherein the plurality of subsets of training data includes:
    a first subset of training data including utterances of a first number of speakers among the plurality of speakers, and
    at least one second subset of training data, each second subset including utterances of a number of speakers among the plurality of speakers that is less than the first number of speakers among the plurality of speakers,
    wherein performing the plurality of tasks to train the machine learning model includes performing one task using the first subset of training data and two or more tasks using the at least one second subset of training data.

11. The computer program product of claim 10, wherein
    the machine learning model includes a first model for converting an utterance of the plurality of utterances into a feature vector and a second model for identifying a speaker of the plurality of speakers from a feature vector, and
    each utterance of the plurality of utterances in the training data is paired with an identification of a speaker of the plurality of speakers corresponding thereto.

12. The computer program product of claim 11, wherein the operations further comprise producing a converter that converts an utterance of a speaker of the plurality of speakers into a feature vector by training the first model.

13. The computer program product of claim 11, wherein performing the plurality of tasks includes using a value of at least one hyperparameter of the task using the first subset of training data that is different from the value of the at least one hyperparameter of the task using the at least one second subset of training data.

14. The computer program product of claim 10, wherein the utterances of the second subset of training data are obtained from a single continuous recording.

15. An apparatus comprising:
    a processor or programmable circuitry; and
    one or more computer readable storage mediums collectively including instructions that, when executed by the processor or the programmable circuitry, cause the processor or the programmable circuitry to:
    obtain training data including a plurality of utterances of a plurality of speakers; and
    perform a plurality of tasks to train a machine learning model that converts an utterance of the plurality of utterances into a feature vector, each task using one of a plurality of subsets of training data, wherein the plurality of subsets of training data includes:
a first subset of training data including utterances of a first number of speakers among the plurality of speakers, and
at least one second subset of training data, each second subset including utterances of a number of speakers among the plurality of speakers that is less than the first number of speakers among the plurality of speakers,
wherein performing the plurality of tasks to train the machine learning model includes performing one task using the first subset of training data and two or more tasks using the at least one second subset of training data.

16. The apparatus of claim 15, wherein
the machine learning model includes a first model for converting an utterance of the plurality of utterances into a feature vector and a second model for identifying a speaker of the plurality of speakers from a feature vector, and
each utterance of the plurality of utterances in the training data is paired with an identification of a speaker of the plurality of speakers corresponding thereto.

17. The apparatus of claim 16, wherein the instructions further cause the processor or the programmable circuitry to produce a converter that converts an utterance of a speaker of the plurality of speakers into a feature vector by training the first model.

18. The apparatus of claim 16, wherein performing the plurality of tasks includes using a value of at least one hyperparameter of the task using the first subset of training data that is different from the value of the at least one hyperparameter of the task using the at least one second subset of training data.

19. The apparatus of claim 15, wherein the utterances of the second subset of training data are obtained from a single continuous recording.

* * * * *